United States Patent Office 3,705,106
Patented Dec. 5, 1972

---

3,705,106
NONOXIDIZING ACIDIC COMPOSITIONS CONTAINING ROSIN AMINE AND ACETYLENIC CORROSION INHIBITORS
Thaddeus M. Muzyczko, Melrose Park, Samuel Shore, Roselle, and Jerome A. Martin, Chicago, Ill., assignors to The Richardson Company, Melrose Park, Ill.
No Drawing. Original application Mar. 21, 1968, Ser. No. 714,771, now Patent No. 3,632,524. Divided and this application Feb. 8, 1971, Ser. No. 113,648
Int. Cl. C23f 11/04, 11/14; C23g 1/06
U.S. Cl. 252—148          8 Claims

ABSTRACT OF THE DISCLOSURE

Corrosion inhibiting compositions for use with aqueous systems and based on a combination of a rosin amine, ethoxylated rosin amine, ethyloctynol, and propargyl alcohol. The compositions include both mixtures and reaction products thereof.

CROSS REFERENCE TO RELATED APPLICATION

This is a division of application Ser. No. 714,771, filed Mar. 21, 1968 now U.S. Pat. No. 3,632,524.

BACKGROUND OF THE INVENTION

This invention relates to corrosion inhibiting compositions useful in aqueous systems and based on a combination of rosin amine, ethoxylated rosin amine, ethyloctynol, and progargyl alcohol and include reaction products of the above components. These compositions are particularly useful under high temperature conditions encountered in several corrosive environments.

In many instances, corrosion of metal surfaces occurs at relatively high temperatures (i.e. 200° F. and above) and require particularly effective corrosion inhibiting compositions to reduce the corrosion rates encountered. Illustrative of these high temperature environments are the protection of oil wells from acidic conditions encountered during secondary recovery procedures and the like, as well as high temperature cleaning of metal surfaces of industrial equipment wherein the high temperature increases the removal of soil and other particles from the metal surfaces.

In view of the above, it is important to provide effective corrosion inhibiting compositions useful in aqueous systems at relatively high temperatures. These aqueous systems represent both solutions and systems in which water is one of the phases as in oil well treatment and oil recovery.

SUMMARY OF THE INVENTION

Briefly, the invention is directed to corrosion inhibiting compositions which comprise in combination a rosin amine, ethoxylated rosin amine, ethyloctynol, and propargyl alcohol. These compositions include products of reacting the rosin amine with the ethyloctynol and propargyl alcohol in the presence of or in later combination with the ethoxylated rosin amine.

The resulting combination of components are useful in reducing corrosion in aqueous systems containing acidic substances. These substances are usually present either through environmental conditions as in oil wells or from the addition of non-oxidizing acid such as hydrochloric acid for cleaning purposes.

In forming combinations of the above components, generally the respective amounts of the rosin amine, ethoxylated rosin amine, ethyloctynol, and propargyl alcohol are about 4–16, 20–80, 2–20 and 5–30 on a 100 percent weight percentage basis.

DESCRIPTION OF THE PREFERRED EMBODIMENTS

The rosin amine is descriptive of amines prepared from rosin and contains such groups as abietyl, hydroabietyl and dehydroabietyl as illustrated in U.S. 2,564,758 and U.S. 2,758,970. Advantageously, the amine is primary or secondary and preferably primary to provide desired solubility in aqueous systems and reactivity with the above acetylenic alcohols.

The ethoxylated rosin amine is as described in U.S. 2,564,758 and is essentially the above rosin amine ethoxylated with one or more ethylene oxide or substituted ethylene oxide groups. Preferably, the amine is fully ethoxylated.

The remaining essential components are ethyloctynol and propargyl alcohol. Preferably, the ethyloctynol is 4-ethyl-1-octyn-3-ol.

The above components are generally combined in the following weight ratios: 4–16:20–20:2–20:5–30. Advantageously, the ratio is 8–15:60–70:4–12:10–20 and preferably 11:65:8:16 with the ethyloctynol being 4-ethyl-1-octyn-3-ol.

As indicated above, the corrosion inhibitors include reaction products of rosin amine with ethyloctynol and propargyl alcohol. The reaction can also be carried out in the presence of the ethoxylated rosin amine. Advantageously, reflux conditions which usually are at temperatures of about 125° C. are used in preparing reaction products. Generally, the products are made in small amounts and the reaction mixture therefore includes significant amounts of the reactants.

While the above components constitute the corrosion inhibitor of the invention, in many instances it is desirable to include an organic diluent and/or extender which acts to promote the effectiveness of the inhibitor in contact with the metal surface. These generally are materials which either increase the compatability of the inhibitors in the corrosive system or increase the retention of the inhibitor on the metal surface without reducing the ability of the aqueous medium to remove rust and soil particles in cleaning operations. Suitable materials are: ethoxylated amines, ehtoxylated phenols, coal tar and the like. Advantageously, it is an ethoxylated alkyl amine such as dodecylaminoethylamine. Coal tar alone or in combination with the amine also provides useful protection. Generally, the extender is present in amounts sufficient to provide the desired effectiveness. For the amines, about 10–20 weight percent is commonly used, while for coal tar about 1–3 weight percent is present based on the total composition.

The corrosion inhibitors as described above are useful in the method of inhibiting the corrosion of metals in contact with aqueous, non-oxidizing acids such as hydrochloric, phosphoric, hydrofluoric, citric, sulfuric and the like associated with cleaning operations. The method is carried out by incorporating a small but effective amount in the acid system. Generally about 0.01–0.5 weight percent of the inhibitor is used. In the treatment of oil wells, amounts required will depend somewhat on the particular corrosive environment and the aqueous system present. In some instances the aqueous system will be formed within the well and the inhibitor added with an oil to form a concentration extractable by the water phase in contact with the metal piping and equipment.

With aqueous, nonoxidizing acids used in cleaning, the result of the incorporation of the inhibitor is a composition consisting essentially of the acid and the above corrosion inhibiting composition.

The following examples illustrate some of the embodiments of this invention. It is to be understood that these are for illustrative purposes only and do not purport to be wholly definitive with respect to conditions or scope.

Example I

A two liter reaction flask was charged with a mixture of 323 grams ethoxylated rosin amine and 157 grams rosin amine. The rosin amine was primarily based on dehydroabietyl and abietyl amines. About 40 grams 4-ethyl-1-octyn-3-ol was added slowly with good agitation, followed by the addition of about 80 grams of propargyl alcohol. This mixture was a clear, amber, low viscosity liquid and was identified as Formula A.

Example II

A two liter reaction flask was charged with a mixture of about 646 grams ethoxylated rosin amine, 114 grams rosin amine, 80 grams 4-ethyl-1-octyn-3-ol and 160 grams propargyl alcohol. This solution was refluxed for eight hours at approximately 125° C. with good agitation. The final product was a dark, amber, mobile liquid and was identified as Formula B.

Example III

About 54 grams of Formula B was mixed with 17.2 grams ethoxylated dodecylaminoethylamine at about 25° C. in a round bottom flask. USP grade coal tar was slowly added until about 2 grams were present in the flask. About 26 grams of anhydrous isopropanol was next added as a diluent. This product was identified as Formula C.

The procedure used in testing was based on NACE T–8 test method as reported in Materials Protection, May 1962, page 107, and also based on known field conditions. Briefly, 1" x 2" x 1/16" coupons are milled from representative sheet steel stock. These coupons are then buffed, uniformly etched with inhibited hydrochloric acid, cleaned with detergent and finally rinsed with acetone. Test acid solutions are made up by diluting 18° reagent grade hydrochloric acid with 150 p.p.m. hardness water. The coupons are weighed and completely immersed in inhibited acid solutions under static conditions at various temperatures. After the elapsed time has occurred, the coupons are withdrawn, washed with detergent, then acetone, and reweighed to determine weight losses. Duplicate samples are used at all concentration levels, including control (uninhibited) solutions. The coupons are also inspected for pitting and general surface appearance.

The corrosion rates are listed in Tables I–III below and include a commercial inhibitor for comparison purposes.

TABLE I

| Inhibitor concentration, volume percent | Temperature, °F. | Steel | Corrosion rates, #/ft.², 24 hrs | |
|---|---|---|---|---|
| | | | Formula C | Commercial Inhibitor |
| .025 | 200 | 1010 | .0160 | .1110 |
| .050 | 200 | 1010 | .0034 | .0150 |
| .100 | 200 | 1010 | .0022 | .0059 |

Note.—Control, 1.94 #/ft.², 24 hrs.

TABLE II

| | Volume percent | Temperature °F. | Steel | Corrosion rates, #/ft.², 24 hrs. |
|---|---|---|---|---|
| Formula: | | | | |
| A | .025 | 200 | 1010 | .0109 |
| A | .050 | 200 | 1010 | .0055 |
| A | .100 | 200 | 1010 | .0040 |
| B | .100 | 200 | 1010 | .0022 |

Note.—Control, 1.90 #/ft.², 24 hrs.

TABLE III

| | Volume percent | Temperature °F. | Steel | Corrosion rates, #/ft.², 24 hrs. |
|---|---|---|---|---|
| Formula: | | | | |
| A | .100 | 200 | 1010 | .0035 |
| C | .100 | 200 | 1010 | .0020 |

Note.—1.90 #/ft.², 24 hrs.

The above results demonstrate the performance of the corrosion inhibitors of the invention. It will be noted that the performance of the inventive compositions was superior to that of the comparative inhibitor even at lower concentration levels as indicated by the values of .0034 at .050 volume percent and .0059 at 0.100 volume percent for the inventive composition and comparative inhibitor.

While the invention has been described in conjunction with specific examples thereof, these are illustrative only. Accordingly, many alternatives, modifications and variations will be apparent to those skilled in the art in the light of the foregoing description, and it is therefore intended to embrace all such alternatives, modifications, and variations as to fall within the spirit and broad scope of the appended claims.

We claim:

1. A method of inhibiting the corrosion of metals in contact with aqueous systems containing a corrosive acid, comprising incorporating into the aqueous system in a small but effective amount a corrosion inhibiting reaction product prepared by heating to its reaction temperature a mixture of a rosin amine, octargyl alcohol and propargyl alcohol, the reactants being present in the range from about 4% to 16%, 2% to 20% and 5% to 30% by weight respectively, said rosin amine is a material selected from the group consisting of primary and secondary amines prepared from rosin and having abietyl, hydroabietyl and dehydroabietyl groups.

2. The method of claim 1 wherein the effective amount of the reaction product is about 0.01–0.5% by weight of the aqueous acid, said acid being nonoxidizing.

3. The method of claim 2 wherein the acid is hydrochloric acid.

4. The method of claim 1 which includes incorporating the reaction product into hydrocarbon oil and contacting the oil with the aqueous phase.

5. A composition consisting essentially of aqueous, nonoxidizing acid and in a small but effective amount, a corrosion inhibiting reaction product prepared by heating to its reaction temperature a mixture of a rosin amine, octargyl alcohol and propargyl alcohol, the reactants being present in the range from about 4% to 16%, 2% to 20% and 5% to 30% by weight respectively, said rosin amine is a material selected from the group consisting of primary and secondary amines prepared from rosin and having abietyl, hydroabietyl and dehydroabietyl groups.

6. The composition of claim 5 wherein the acid is hydrochloric and the effective amount of the reaction product is about 0.01–0.5% by weight of the aqueous, hydrochloric acid.

7. The composition of claim 6 wherein the reaction product includes in the reaction mixture an ethoxylated rosin amine in an amount from 20% to 80% by weight, said amine being a material selected from the group consisting of primary and secondary amines having one or more ethylene oxide or substituted ethylene oxide groups and the octargyl alcohol is 4-ethyl-1-octyl-3-ol.

8. The composition of claim 7 wherein in the reaction product the rosin amine, ethoxylated rosin amine, 4-ethyl-1-octyn-3-ol and propargyl alcohol reactants are present in the ratio of 11:65:8:16, respectively.

References Cited

UNITED STATES PATENTS

| | | | |
|---|---|---|---|
| 2,758,970 | 8/1956 | Saukaitis et al. | 252—392 |
| 2,975,125 | 3/1961 | Saugaitis et al. | 252—396 |
| 3,249,548 | 5/1966 | Herman et al. | 252—148 |

FOREIGN PATENTS

| | | | |
|---|---|---|---|
| 751,850 | 1/1967 | Canada | 252—148 |

LEON D. ROSDOL, Primary Examiner

I. GLUCK, Assistant Examiner

U.S. Cl. X.R.

21—2.7; 134—3 and 41; 252—8.55 E, 146, 392, 396